United States Patent [19]

Solund

[11] Patent Number: 4,793,472
[45] Date of Patent: Dec. 27, 1988

[54] CONVEYOR, IN PARTICULAR FOR OBJECTS SUSPENDED FROM HANGERS

[75] Inventor: Jørgen Solund, Tappernøje, Denmark

[73] Assignee: ITS-Intern Transport System A/S, Tappernøje, Denmark

[21] Appl. No.: 64,942

[22] PCT Filed: Oct. 15, 1986

[86] PCT No.: PCT/DK86/00117

§ 371 Date: May 27, 1987

§ 102(e) Date: May 27, 1987

[87] PCT Pub. No.: WO87/02339

PCT Pub. Date: Apr. 23, 1987

[30] Foreign Application Priority Data

Oct. 16, 1985 [DK] Denmark ............... 4727/85

[51] Int. Cl.$^4$ ............... B65G 25/00
[52] U.S. Cl. ............... 198/774
[58] Field of Search ............... 198/465.4, 468.6, 774, 198/765; 417/750

[56] References Cited

U.S. PATENT DOCUMENTS

| 2,057,367 | 10/1936 | Cone . | |
| 2,788,885 | 4/1957 | Begent . | |
| 3,084,787 | 4/1963 | Moseley | 198/774 |
| 3,086,642 | 4/1963 | Schwarz | 198/774 |
| 3,420,358 | 1/1969 | Iversen | 198/774 |
| 3,451,532 | 6/1969 | Manterfield . | |
| 3,581,880 | 6/1971 | Iversen | 198/774 |
| 3,735,852 | 5/1973 | O'Keefe | 198/774 |
| 4,344,363 | 8/1982 | Veith | 198/465.4 |
| 4,655,141 | 4/1987 | Gillson | 198/774 |

FOREIGN PATENT DOCUMENTS

| 206939 | 10/1907 | Fed. Rep. of Germany . | |
| 2164087 | 6/1973 | Fed. Rep. of Germany . | |
| 2203056 | 8/1973 | Fed. Rep. of Germany . | |
| 1020253 | 2/1953 | France | 198/765 |
| 2376047 | 9/1978 | France | 198/774 |
| 151288 | 10/1981 | German Democratic Rep. | 198/468.6 |
| 518425 | 7/1976 | U.S.S.R. | 198/774 |
| 1417373 | 12/1975 | United Kingdom | 198/774 |
| 1560752 | 5/1977 | United Kingdom . | |

Primary Examiner—Joseph E. Valenza
Attorney, Agent, or Firm—Browdy and Neimark

[57] ABSTRACT

A conveyor consisting of a cross-sectionally U-shaped, elongate, stationary rail with the opening upwards, a rod reciprocably mounted therein, and an operating mechanism for reciprocating the rod, the upper edge of the rod being lifted above the opening of the stationary rail by movement in the forward direction and being lowered below said opening by movement in the rearward direction. Lifting and lowering are effected by means of U-shaped slide members with inclined tracks to cooperate with projections on the sides of the rod. When the rod is moved forwardly, its upper edge rises above the upper edge of the stationary rail and lifts and therefore carries along the hangers in the forward direction. During the rearward movement, the upper edge of the rod is lowered below the upper edges of the stationary rail, so that the hangers remain thereon and are not carried along in the rearward direction.

8 Claims, 3 Drawing Sheets

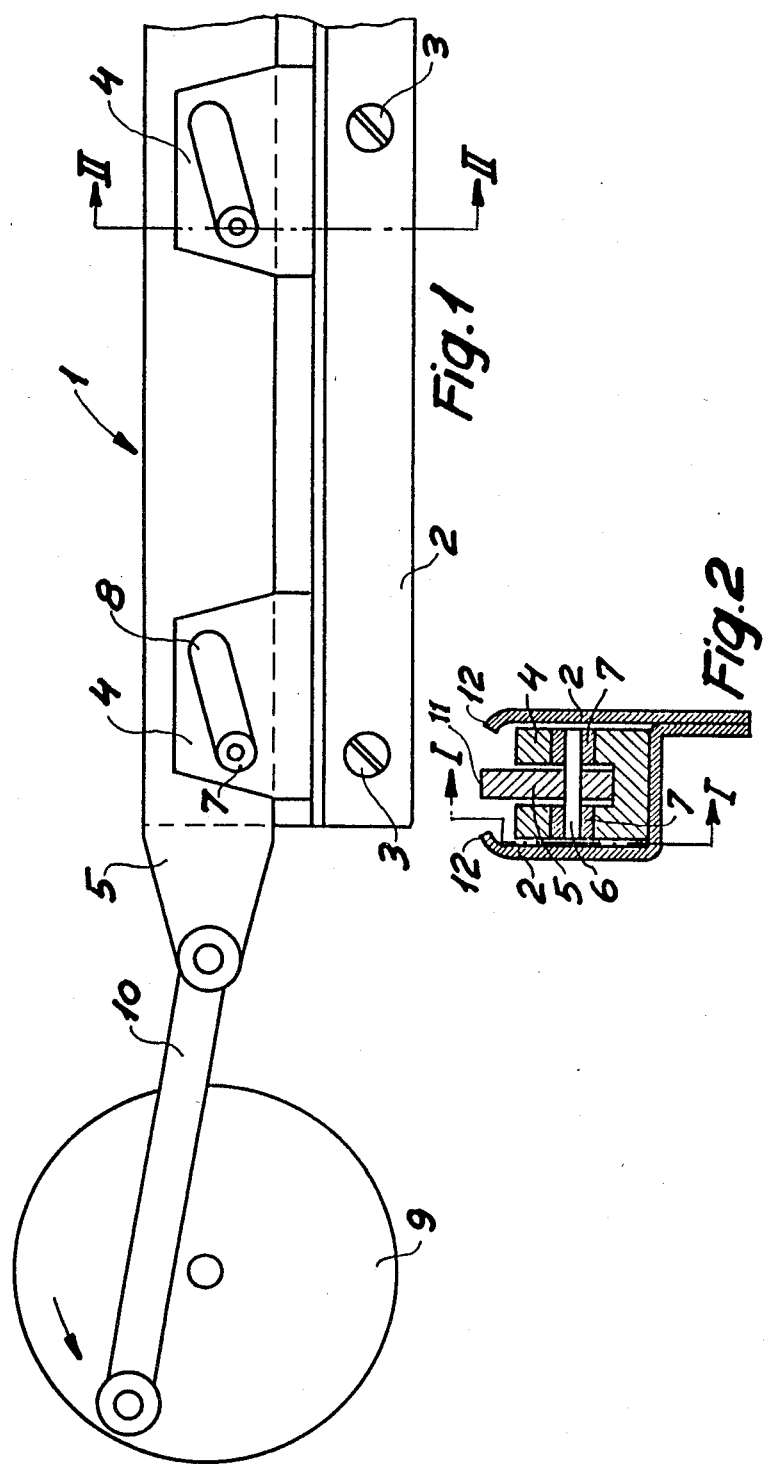

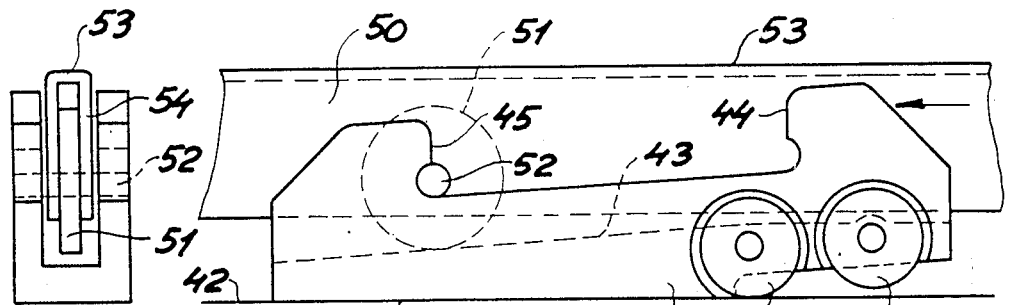
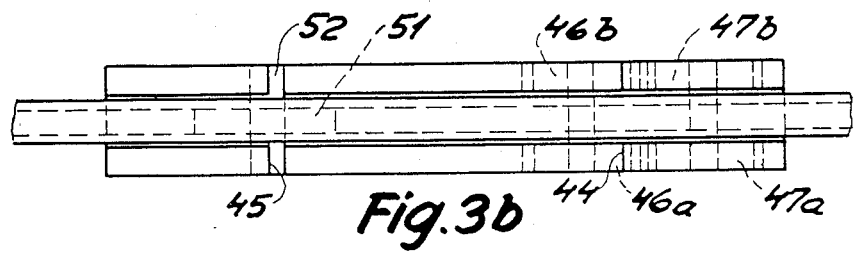
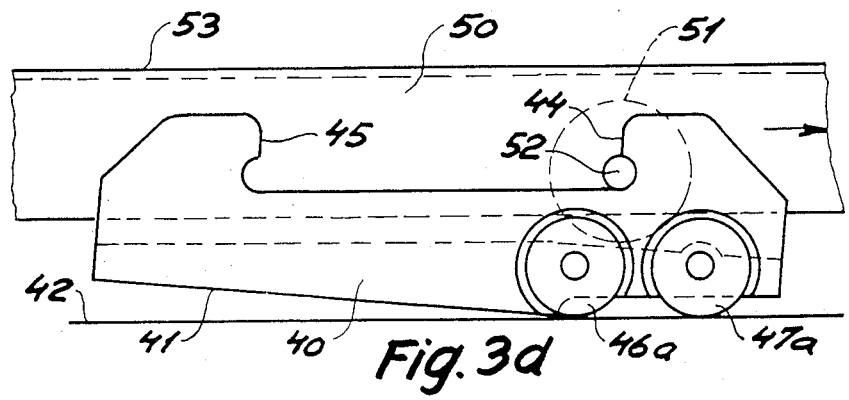

CONVEYOR, IN PARTICULAR FOR OBJECTS SUSPENDED FROM HANGERS

BACKGROUND OF THE INVENTION

The invention concerns a conveyor for objects suspended from hangers, which consists of a cross-sectionally U-shaped stationary means having an upwardly facing opening and a rod-shaped member reciprocable therein by an operating mechanism. The upper edge of the rod-shaped member is adapted to be lifted above the opening of the stationary means by coupling means upon movement in the forward direction and to be lowered below the opening upon movement in the rearward direction.

Such a conveyor is known from the U.S. Patent Specification 2,057,367.

SUMMARY OF THE INVENTION

The object of the present invention is to provide such a conveyor which has a simple structure and is easy to erect.

This object is achieved according to the invention in that the the coupling means of the conveyor consists of U-shaped slide members having an upwardly facing opening which are slidable in the longitudinal direction of the stationary means upon overcoming frictional forces. The slide members accommodate the movable rod-shaped member and have tracks or faces inclined with respect to the direction of movement of the rod-shaped member to cooperate with projections or rollers. These tracks or inclined faces are shorter than the stroke of the rod-shaped member during its reciprocating movement.

In use, the hangers are suspended from the conveyor so that the hook of the hanger is positioned around the upper edges of the U-shaped stationary means. When the rod-shaped member is moved forwardly, its upper edge rises above the upper edges of the stationary means and lifts and therefore carries the hangers along in the forward direction. When the rod-shaped member is moved rearwardly, its lower edge is lowered below the lower edges of the stationary means so that the hanger remains thereon and is not carried along in the rearward direction. Consequently, the hangers are carried along at a speed which is essentially proportional to the frequency of the reciprocating movement and the stroke of this movement.

BRIEF DESCRIPTION OF THE DRAWINGS

The invention will be described more fully below with reference to the drawings, in which:

FIG. 1 shows the conveyor of the invention, as seen from the side in section along the line 1—1 in FIG. 2, FIG. 2 is a cross-section along the line 2—2 in FIG. 1, FIG. 3a is a schematic and lateral view of a second embodiment of the invention during a rearward movement of a rod-shaped member shown in the figure, FIG. 3b shows the same as FIG. 3a, seen from above, FIG. 3c is a vertical cross-section of the rod-shaped member of FIGS. 3a and 3b with a wheel journalled in it, FIG. 3d shows the same as FIG. 3a, but during a forward movement of the rod-shaped member.

DETAILED DESCRIPTION OF THE PREFERRED EMBODIMENTS

Figure 4A:
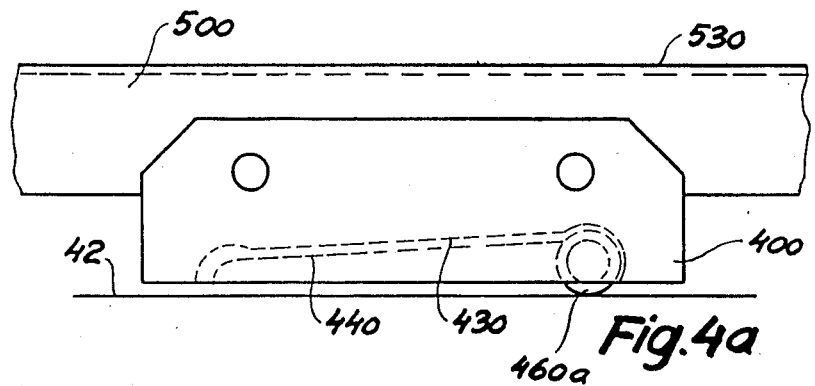
FIG. 4a is a schematic view of a third embodiment of the invention during a rearward movement of a rod-shaped member shown in the figure.

One end of a conveyor 1 of the invention, very long in principle, is shown in FIG. 1 of the drawing.

The conveyor shown in the drawing consists of a stationary cross-sectionally U-shaped rail 2, which is secured to a suspension device (not shown) e.g. by means of screws 3.

Within the U-shaped rail 2 there is provided a plurality of longitudinally evenly spaced slide members 4, which preferably are made of plastic and which can be displaced in the longitudinal direction of the U-shaped rail 2 when overcoming a certain friction.

The slide members 4 are likewise U-shaped, as shown, and form a mount for a rod-shaped member or a rod 5 of flat iron or optionally plastic, which can easily slide in the slide members 4, and which has a length corresponding to that of the rail 2.

The rod 5 has, on both sides thereof, longitudinally evenly spaced projections 6 with rollers 7, which are journalled in longitudinal, inclined tracks 8 in the slide members 4.

The rod 5 may be reciprocated with respect to the rail 2 by means of an operating mechanism, which is a crank 9 in the illustrated embodiment, which reciprocates, upon rotation in the direction of the arrow, a connecting rod 10 which is journalled at one end of the rod 5.

Alternatively, the operating mechanism may be a hydraulic cylinder or a pneumatic cylinder, and instead of engaging the rod 5 at one end thereof, it may engage the rod through a cut in the U-shaped rail 2. Another possibility is to replace the crank 9 by a closed chain path.

The stroke of the reciprocating movement of the rod 5 is considerably longer than the inclined tracks 8 in the slide members 4.

During the movement of the rod 5 to the right in FIG. 1, the rod is lifted so much by the engagement of the rollers 7 with the tracks 8 that the upper edge 11 of the rod 5 rises above the upper edges 12 of the rail 2. When, during this part of the movement, the rollers 7 reach the right-hand end of the tracks 8, the slide members 4 are carried along during the further movement of the rod 5 to the right against the frictional force between the slide members 4 and the rail 2.

When the rod 5 is then returned to the left in FIG. 1, its upper edge 11 is first lowered below the upper edge 12 of the rail 2, with the rollers 7 reaching the lefthand end of the tracks 8. Then the movement of the rod 5 is continued to the left, while its upper edge 11 is still below the upper edges 12 of the rail 2. During this movement, the slide members 4 are carried along to the left against the frictional force against the rail 2.

Hangers for clothes or other objects hanging in over the upper side of the rail 2 will thus be moved from the left to the right.

Several conveyors may be mounted side by side, so that large objects, such as boxes resting on the upper side of the conveyor, may likewise be carried along.

It should also be mentioned that the transport movement does not have to be horizontal, since the rail 2 may form a certain angle with the horizontal.

Further, the upper side 11 of the rod 5 may be rugged or serrated, so that a greater frictional force may be transferred to the hangers or other transported objects.

On the other hand, the upper side 11 of the rod may be coated with or be formed from a material with a low coefficient of friction, so that a large number of hangers or other objects can be accumulated against a stop with a minimum pressure of accumulation.

FIGS. 3a-3d show a second embodiment of the invention, and the stationary U-shaped rail is omitted from these figures for reasons of clarity.

FIG. 3a shows a second embodiment of a slide member 40 whose underside 41 slides on the internal bottom (symbolized at 42) of the U-shaped stationary rail (not shown) during the shown rearward movement of a rod-shaped member 50.

The rod-shaped member 50 is slidably mounted in the slide member 40 and has a wheel 51 accommodated therein, as appears in particular from FIG. 3c, to cooperate with an inclined face 43 in the internal bottom of the slide member 40. The wheel 51 is journalled on a shaft 52 whose end protruding beyond the rod-shaped member cooperate with stop means 44 and 45 in the forwardly directed and rearwardly directed end of the slide member 40, respectively.

The slide member 40 has two pairs of wheels 46a, 46b and 47a, 47b, respectively, journalled in the forwardly directed end, and only the pair of wheels 46a, 46b touch the bottom 42 when the slide member 40 is in the position shown in FIG. 3a, in which the rod-shaped member 50 is moved rearwardly, while its upper edge 53 is below the upper edges of the U-shaped stationary means (not shown) corresponding to the rail 2 in FIGS. 1 and 2.

When the rod-shaped member 50, like the rod 5 in FIG. 1, is moved to the right, it first slides or rolls with the wheel 51 on the inclined face 43 until the protruding shaft ends of the wheel abut the stop means 44. This position appears from FIG. 3d. During this movement the load impact from the rod-shaped member 50 and the load from clothes hangers or heavier goods supported by said member is moved together with the wheel 51 to the area between the pairs of wheels 46a, 46b, and 47a, 47b. The slide member 40 tilts so that it rolls on the mentioned pairs of wheels, thereby reducing the kinetic resistance between the slide member 40 and the bottom 42. At the same time, the rod-shaped member 50 has been lifted so much because of the movement of the wheel 51 up the inclined face 43 in spite of the mentioned tilting that the upper edge extends above the edges of the stationary U-shaped means, and during the further movement of the rod-shaped member to the right (carrying along the slide member 40) the transported goods will also be moved to the right.

FIGS. 4a-4d show a third embodiment of the invention. This embodiment is shown in a manner similar to the second embodiment, without indicating the stationary U-shaped means, but only its internal bottom 42.

In this third embodiment, the slide members, a single one 400 being shown, are secured to the rod-shaped member 500, e.g. by rivets.

Figure 4C:
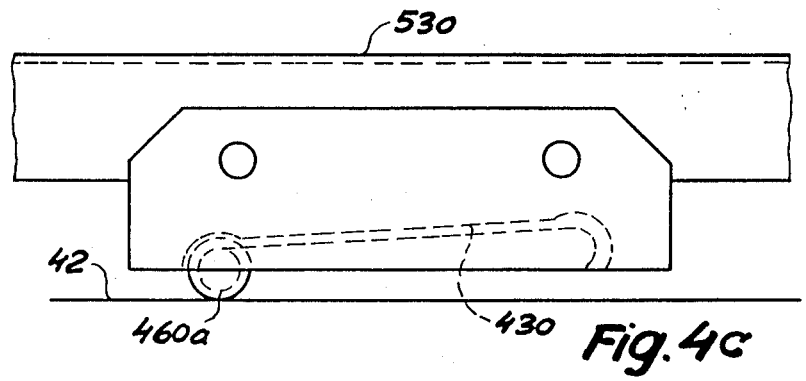
FIG. 4c shows the same as FIG. 4a, but during a forward movement of the rod-shaped member.
Figure 4B:
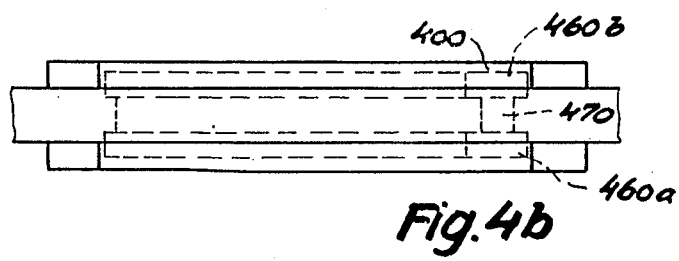
FIG. 4b shows the same as FIG. 4a, seen from above.

The slide member 400 has a downwardly directed inclined face at both sides of the rod-shaped member 500, only one of these inclined faces 430 being visible in FIGS. 4a and 4c.

Between each of these inclined faces and the internal bottom 42 in the stationary U-shaped means there is provided a roller 460a and 460b, on which the slide member 400 rolls during its movement from the position in FIG. 4a to the position in FIG. 4c. The rollers 460a and 460b are interconnected by a shaft 470. The slide member 400 is formed with a depression 440 between the inclined faces on the two sides of the slide member 440, so that the shaft 470 does not touch the slide member 400 during the movement from the position in FIG. 4a to the position in FIG. 4c. During this movement, the slide member 400 is lifted with the rod-shaped member 500 as shown so that the upper edge 530 of the lattter rises from below the upper edges of the stationary U-shaped means (not shown) up above these upper edges. During the continued movement of the rod-shaped member to the right, hangers or other material is therefore moved by the upper edge 530 to the right. At both end positions, shown in FIGS. 4a and 4c, the bottom of the depression 440 in the material of the slide members forms a slide bearing for the shaft 470, while the rollers 460a and 460b in these positions clear their respective inclined tracks.

This third embodiment is characterized by being very simple to manufacture and by its ability to transport very heavy loads.

Figure 4D:
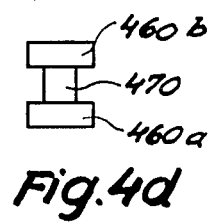
FIG. 4d is an enlarged view of the set of rollers of the embodiment shown in FIGS. 4a to 4c, with a shaft interconnecting the rollers.

The rollers 460a and 460b shown in FIG. 4d and their connecting shaft are preferably made in one piece of steel.

I claim:

1. A conveyor for conveying objects suspended from hangers, said conveyor comprising:
    a cross-sectionally U-shaped stationary means having an upwardly facing opening;
    rod-shaped member reciprocally mounted within said stationary means;
    an operating mechanism for reciprocating said rod-shaped member;
    coupling means for lifting said rod-shaped member upwardly such that an upper edge thereof extends above the opening of said stationary means upon movement in a forward direction and for lowering said rod-shaped member such that the upper edge is lowered below the opening upon movement in a rearward direction, said coupling means comprising U-shaped slide members having an upwardly facing opening, said slide members being slidable in the longitudinal direction of said stationary means upon overcoming frictional forces, said slide members accommodating the movable rod-shaped member and having means which are inclined with respect to the direction of elongation of the rod-shaped member, said inclined means being shorter than the stroke of said rod-shaped member during its reciprocating movement; and
    projections secured to said rod-shaped member and adapted to cooperate with said inclined means, said slide members only being movable relative to said stationary means after said operating mechanism has moved said rod-shaped member and said projections the length of said inclined means.

2. The conveyor according to claim 1, wherein said inclined means comprises inclined tracks for guiding said projections.

3. The conveyor according to claim 2, wherein said rod-shaped member is slidably journalled in each of said slide members between extreme positions in which said projections abut one or the other end of the inclined tracks.

4. The conveyor according to claim 1, wherein said inclined means comprises inclined faces for guiding said projections.

5. The conveyor according to claim 4, wherein said rod-shaped member accommodates a wheel for cooperating with an inclined face in the internal bottom of the U-shaped slide member.

6. The conveyor according to claim 5, wherein each slide member has wheels at its front end in the forward direction to support the slide member in said stationary means during the movement of said rod-shaped member in its forward direction.

7. A conveyor for conveying objects suspended from hangers, said conveyor comprising:
   a cross-sectionally U-shaped stationary means having an upwardly facing opening;
   a rod-shaped member reciprocally mounted within such stationary means;
   an operating mechanism for reciprocating said rod-shaped member;
   a coupling means for lifting such rod-shaped member upwardly such that an upper edge thereof extends above the opening of said stationary means upon movement in a forward direction and for lowering said rod-shaped member such that the upper edge is lowered below the opening upon movement in a rearward direction, said coupling means comprising U-shaped slide members having an upwardly facing opening and at least one downwardly directed inclined face, said slide members being slidable in the longitudinal direction of said stationary means upon overcoming frictional forces, said slide members being secured to the moveable rod-shaped member and each inclined face is inclined with respect to the direction of elongation of the rod-shaped member, said inclined face being shorter than the stroke of said rod-shaped member during its reciprocating movement, and a roller positioned between the inclined face of said slide member and the internal bottom of said stationary means supports each slide member for lifting and lowering by rolling along said inclined face as it also rolls along said internal bottom of said stationary means.

8. The conveyor according to claim 7, wherein each slide member has a downwardly directed inclined face at each side, the rollers associated with each of said two inclined faces are interconnected by a shaft, and bearings are formed between the inclined faces for said shaft opposite the ends of the inclined faces.

* * * * *